Sept. 11, 1934.  G. H. SCHIEFERSTEIN  1,973,510
DEVICE FOR BALANCING THE ACTION OF FORCES AND INERTIA
Filed April 25, 1931  2 Sheets-Sheet 2
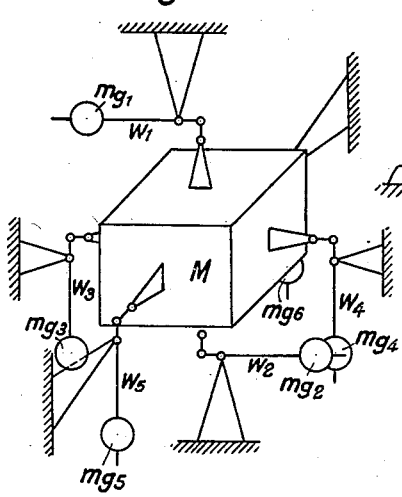
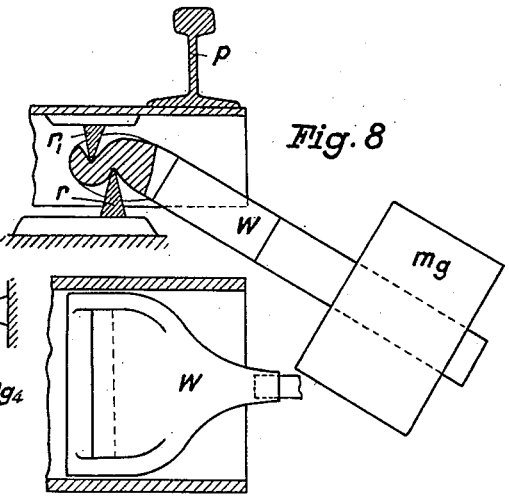
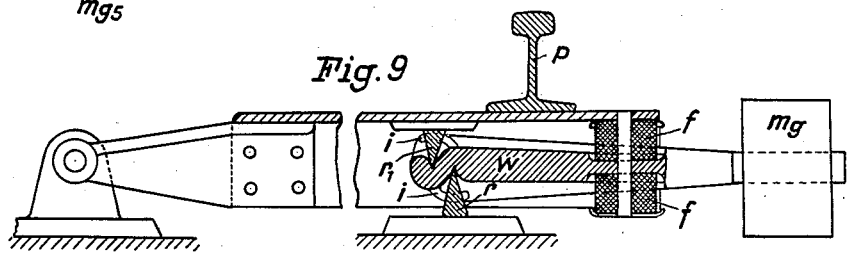
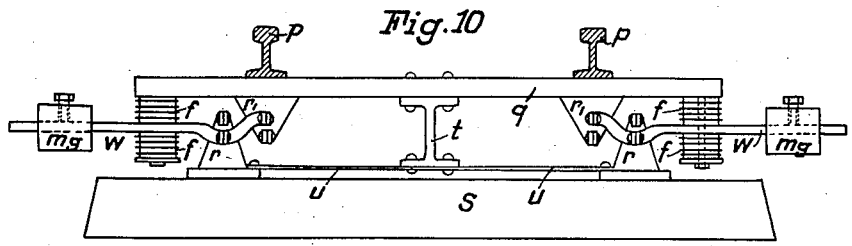
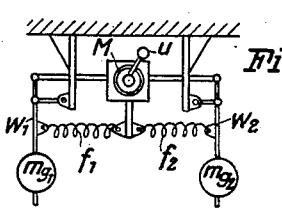
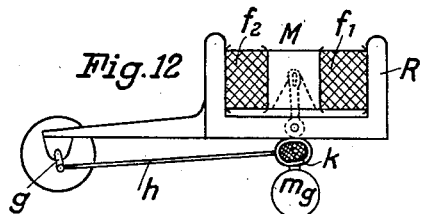
Inventor:
Georg H. Schieferstein
By Sommers & Young Attys Patented Sept. 11, 1934

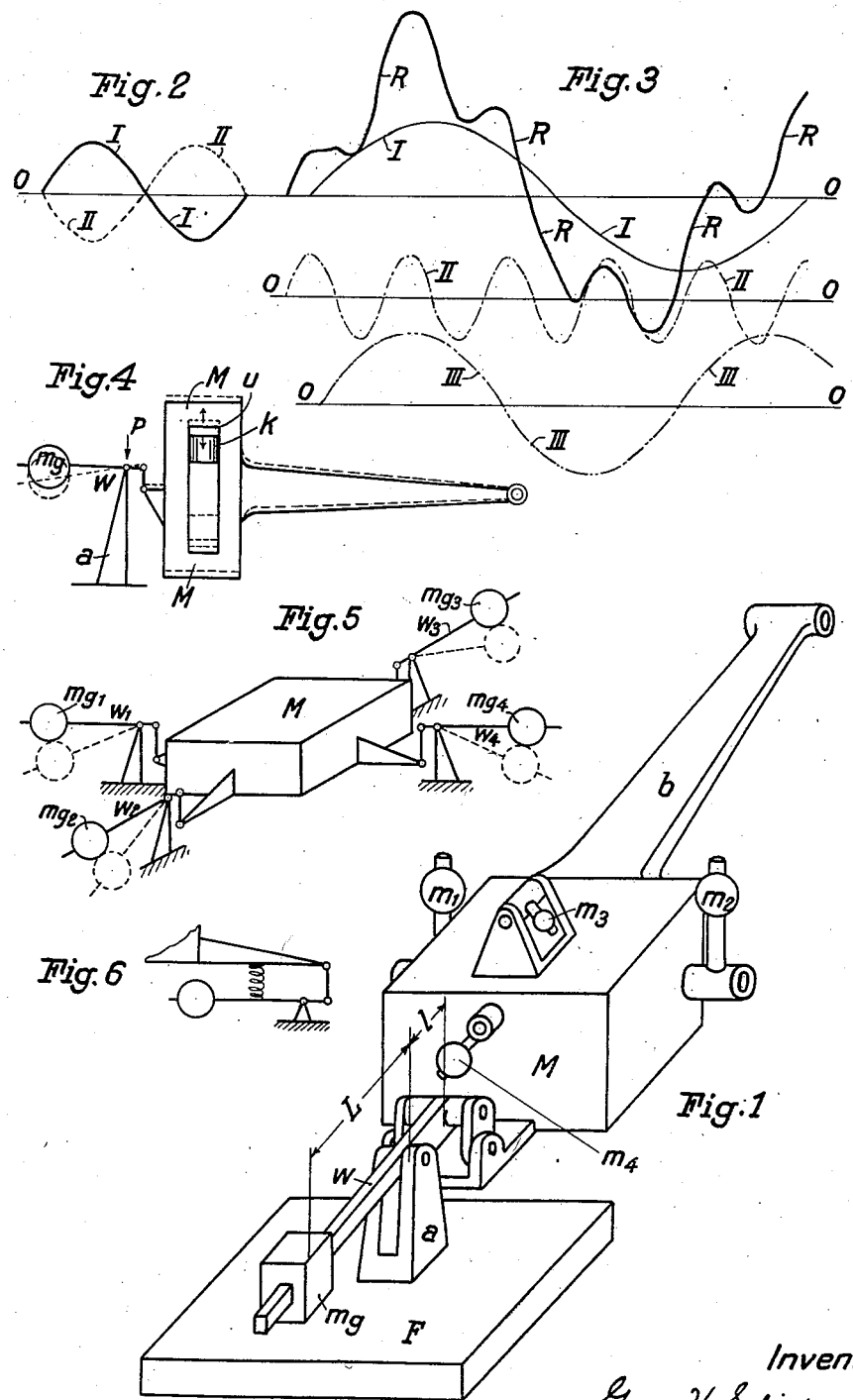

1,973,510

UNITED STATES PATENT OFFICE 1,973,510

DEVICE FOR BALANCING THE ACTION OF FORCES AND INERTIA

Georg Heinrich Schieferstein, Berlin, Germany

Application April 25, 1931, Serial No. 532,915
In Germany July 30, 1929

8 Claims. (Cl. 248—30)

This invention relates to a device for balancing the action of forces and inertia.

It is known that, in consequence of mass movement causes, vibrations may be set up in machines and constitute a source of extensive damage, both to the foundations of the machines themselves and to the adjacent buildings. It is also known that such troubles, especially when resonance phenomena come into question, may be reduced to a permissible value by changes of speed, modifying the specific frequencies detected in the foundations, or by elastic damping means. Attempts have also been made to neutralize vibration phenomena, due for example to piston movements, by arranging for the total mass of the machine to move, in a positive manner, with the pistons, in a proportion which stands in the same relation to the stroke of the piston as the mass of the piston does to the total mass of the machine.

If, however, the case be considered in which a plurality of unbalanced masses in motion or other causes of disturbance, acting in conjunction or independently, cause mass displacements of a very different character at different moments of time, as can be observed, for example, in the simplest case of a multi-cylinder engine, the difficulties are greatly increased, since it is impossible to obtain a complementary compensating mass action by means of simple eccentrics or other mechanical means, the oscillation curve of which is an exact complement of the oscillation curve described by the displacement of the main mass, that is, the production of a movement of a balancing mass which exactly compensates the mass displacement of the main mass.

The present invention will hereinafter be described with reference to the accompanying drawings.

In Fig. 1 a mass M is represented which is vibrated irregularly by the movement of the unbalanced weight members $m'$, $m^2$, $m^3$ and $m^4$. Assuming, for example, that the curve I shown in Fig. 3 is produced by the unbalanced moving masses $m'$, $m^2$, the curve II by $m^3$, and the curve III (Fig. 3) by $m^4$, a resultant R, Fig. 3, would be obtained which might also be further complicated by other reactions due to the work performed by the machine, etc.

The problem underlying the present invention consists not only in the positive elimination of a single and easily noticeable trouble, but the fundamental elimination of all troubles, independently of the amplitude of the mass displacement, the course of the curve, the frequency and any superimpositions of the disturbing forces.

The present invention is based on the discovery that such balancing of masses is possible when use is made of a balancing mechanism which completely reflects each mass displacement with a change of direction of approximately 180°.

According to a further discovery, such a mechanism may be constructed, for example, by connecting the mass to be balanced, by means of a balance beam, with a second mass and brought into equilibrium therewith in accordance with the principle of the balance, it being immaterial whether the state of equilibrium is established by an added mass of equal dimensions to a lever arm of equal length, or by a mass differing in dimensions from the mass to be balanced, and applied to a correspondingly modified lever arm.

In the present instance, a lever $w$ (Fig. 1) is articulated to the mass M, as shown, and supported by a bearing pillar $a$. A sliding weight $m_g$ is adjusted on the lever, so that the masses M and $m_g$ are maintained in equilibrium, and therefore balanced. In this case the masses behave inversely as the corresponding leverages $l$ and $L$, or the distance S and $s$ traversed by the masses in a state of motion. Consequently:

$$\frac{M}{m_g} = \frac{L}{l} = \frac{S}{s}.$$

Such an equation of the balancing of the mass actions of the mass M and the balancing weight $m_g$ can also be obviously expressed by the equations:

$$m_g \cdot \frac{L}{l} = M \text{ and } m_g \cdot \frac{S}{s} = M$$

Expressed in words, by these equations is meant that the product of the mass of the balancing weight $m_g$ and the ratio of the lever arms $$\frac{L}{l}$$

of the lever $w$ must be equal to the mass M, and the product of the mass of the balancing weight $m_g$ and the ratio of the distances traversed by the masses $$\frac{S}{s}$$

must be equal to the mass M.

Assuming that the ratio of $m_g$ to M is $\frac{1}{10}$, equilibrium must necessarily ensue when the ratio of $l$ to L is the same, and, according to the foregoing, a vibration which moves the mass M through 1 mm. must cause the mass $m_g$ to move through 10 mm. In other words, the downward displacement of the mass M through 1 mm. is balanced by the upward displacement of the mass $m_g$ through 10 mm. and vice versa.

The following will show that this is actually the case: Assuming that a movably mounted piston K, in the interior of the mass M (Fig. 4) is in equilibrium with the whole system when in the position shown. A gas under pressure is now admitted into the cylinder space u (Fig. 4). The expanding gas therefore imparts to the piston K a downward acceleration, indicated by the arrow, and a similar acceleration, in the upward direction, to the mass M. Whether the piston is guided by a crank or is brought to a standstill by compressed gases, is, in itself, immaterial. In any event it will exceed, at some point in its stroke, a maximum velocity at which the sign of the acceleration is inverted, and it will finally come to rest in its end position.

The distance s or S which the masses M or K will have travelled in order to reach this limit position, will be, according to the Newtonian law of equilibrium, in inverse ratio to the corresponding masses, i. e.

$$\frac{M}{K} = \frac{S}{s}.$$

It follows therefore that the new equilibrium will come to rest at the place indicated by broken lines in Fig. 4. Nevertheless, the entire system was in a state of dynamic equilibrium during every stage of the movement. At the moment when, for example, the mass M (Fig. 4), begins to move under the imparted upward acceleration the mass $m_g$ therefore moves correspondingly downwards, as it were to maintain the pressure F on the bearing a, exceeding its maximum velocity simultaneously with the mass M and finally reaching the limiting position. The apparent decrease produced in the weight of mass M by the acceleration, would therefore be balanced, in all stages, by an apparent increase in the weight of mass $m_g$, and vice versa.

If the play of forces in the interior of mass M (Fig. 4) has not yet terminated when the limit position of piston K has been reached, and therefore during the descent, a gas is compressed or a revolving mass is set in motion, the movement represented is reversed, starting from the limiting position. The piston K ascends, the mass M descends and $m_g$ once more rises. Even in this case there is no disturbance of equilibrium, but all that occurs will be that a new equilibrium will reach a state of repose in a new limiting position, from which point a further transition to equilibrium of movement can be conceived.

It is essential, for the occurrence of the described effect:
 1. that the two masses shall exactly balance,
 2. that a possibility is afforded for the two balanced masses to oscillate, with a convenient variable amplitude, about a position of equilibrium, upon the occurrence of disturbing forces, and
 3. positive movements in exactly opposite directions (180°).

In order to counteract any occurrent superimposed vibrations, of divergent frequency and curve form, in a machine, or its mass M (Fig. 4), without first having to determine the character of the disturbing oscillations, the total mass M of the machine can be supported at 3 or 4 points—somewhat in accordance with the diagram, Fig. 5—the mass pressure allotted to each point of suspension being balanced or neutralized by the masses $m_g'$ to $m_g^4$.

If the balancing is to be effected automatically, or the machines concerned exert a variable pressure on the support—whether through work material or operative material—the levers w can be bent downwards from their pivoted point, as required—as represented by broken lines in Fig. 5—with the result that by an increasing of the lifting of the levers w, the effective lever arms $m_g$ are made increasingly longer, so that the balancing beams are automatically and instantaneously placed in the correct equilibrium position.

A similar effect is obtained by clamping the lever w of the balancing mass $m_g$ between elastic means f, as shown in Fig. 6. In this case, any occurrent changes of mass are balanced by the auxiliary tension of the elastic means. If steel springs with a linear tension curve be employed in such a case, resonance (critical) phenomena may be observed at certain frequencies, but nevertheless, the efficacy of the mass balancing is not affected thereby. In choosing between bent levers and rubber buffers, it will be observed that, in the former case the frequency diminishes with increasing amplitude, and increases in the other case. Of course, both means can also be used in combination, without thereby affecting the principle of the invention.

Although, in practice, the masses to be balanced usually rest on a foundation, and have only to be balanced in relation thereto, it is also theoretically conceivable that a mass may have to be balanced in reference to two or all three spatial axes.

Fig. 7 is a diagram of such a balancing device. If not only displacement in the direction of the 3 spatial axes have to be balanced, but also in accordance with the conceivable six degrees of freedom, oscillations about the spatial axes, the number of the balancing systems may, for example, be doubled, and their points of application shifts towards the edges. Naturally all the balancing weights $m_g^1$ to $m_g^6$ now cooperate to balance the forces and the mass actions occurring in the mass M. The equations expressing the balancing of the weights, set forth above, may now be expressed in the aggregate form as;

The sum of the products of the masses of the balancing weights $m_g$ and the ratio of the lever arms $$\frac{L}{l}$$

of the levers w must equal the mass M to be balanced, and the sum of the products of the masses of the balancing weights $m_g$ and the ratio of their distances traversed to the distance traversed by the mass M, $$\frac{S}{s}$$

must be equal to the mass M.

A particularly interesting sphere of application of the invention is the balancing of masses in mobile machines, such, for example, as locomotives, and railway carriages, especially when running over bridges.

It is known that railway bridges are stressed, not only by the static load of the vehicles, but also to a large extent by oscillations set up by unbalanced, and mostly periodical mass displacement and the like.

If balance mechanism, of the kind shown, in

Fig. 8, 9 or 10, be introduced, between the bearing portion of a bridge and the railway rails, according to requirements, the entry of a train onto the bridge will result, at first, in the establishment of a condition of dynamic equilibrium between the vehicle and the balancing masses; that is, the balancing masses would be swung into a position of equilibrium corresponding to the momentary static load. This implies nothing of the static weight of the superimposed train, whereas the oscillating forces, set up by the mass M of the train—and approximately representable by the curve I of Fig. 2 are opposed by equal forces on the part of the mass $m_g$ (curve II of Fig. 2). That is to say, the oscillation, which is balanced in itself, pendulates about the position of equilibrium established by the static load in each case, or as may be more clearly expressed, the bearings $r$ are affected solely by their share of the static load.

An arrangement of this kind is represented in Fig. 8. Here $p$ is the railway rail, which rests on a crossbeam provided with the knife-edge bearing—$r'$, a second knife-edge bearing $r$ being provided on the sleeper. The distance between the two bearings represent the short leverage arm of the balance beam $w$ and the distance $r$ from the centre of gravity of the auxiliary mass $m_g$ the longer arm. The proportional weight of the railway train passing over the rails $p$ must therefore bear approximately the same ratio to the mass $m_g$ as the longer effective horizontal lever arm of the mass $m_g$ does to the shorter effective arm $r$, $r$. If this be so, then the mass $m_g$ will move upwards when the train comes along, whilst the rail $p$ and bearing $r'$ sink. Since, during the ascent of the mass $m_g$, the conditions of leverage vary within certain limits, a position of equilibrium will be automatically established, if the mass $m_g$ has been properly adjusted.

Inasmuch as considerable fluctuations in weight must always be expected during the passage of trains, it is advisable (as represented in Fig. 9) to mount the lever $w$ between elastic means $f, f$ in relation to the crossbeam to which the rail $p$ is attached, because this precaution restricts the possible amplitude of movement of the mass $m_g$ within narrower limits, without substantially modifying the principle of the invention. The inclination of the lever $m_g$, for the purpose of producing an automatic varying of leverage, may also, of course, be retained. It is self-evident, that, by the insertion of the elastic means $f, f$ as in Fig. 9 there is constituted an oscillatory and tunable system, which favours certain frequencies, or reacts to jolts by decreasing in its frequency. So far as the intended balancing of forces or masses is concerned, however, all this is only important insofar as greater sensitiveness can be obtained by giving preference to a certain tuning within certain ranges.

Fig. 10 represents a complete device for this purpose. An ordinary railway sleeper S is fitted with two bearings $r$, to each of which is attached a lever $w$ with balance mass $m_g$. On the other side, the short arm of the lever $w$ is pivoted on a bearing $r'$ secured to the crossbeam $q$ which, in turn, carries the rails $p$. The bearings $r$, $r'$ may be of the hinge, knife-edge, ball or roller type, or as shown, in Fig. 10, designed as suspension bearings. In the latter case, it is advisable to prevent lateral displacement by providing on the beam $q$ a support $t$ which, in conjunction with the bearing $r$ allows vertical (but not horizontal) displacement to occur. In order to balance the oscillating loads, the lever $w$ is provided with elastic means $f, f$, which may be in the form of rubber discs, reinforced with iron, or steel springs of known type.

The unanticipated effect of the hereinbefore described process consists in that all disturbing effects of forces and inertia can be completely eliminated, not only in machines and apparatus which rest on foundations, but also even such as are themselves in motion, and that foundations and buildings can be completely isolated in relation to such effects. Consequently, in the present instance, the foundations of bridges need only be calculated and dimensioned to take the static load, and are therefore correspondingly cheaper to construct. Moreover, the application of the method enabled old bridges, which were correctly dimensioned for taking the static load, to be still safely used, inasmuch as there is no need to fear overloading through periodic forces or other especially critical stresses.

A further possible application is the elimination of troubles, due to forces and inertia, in marine engines, motor-car engines, etc. That is to say, parts of the mechanical equipment of a ship or motor car can be mutually balanced in relation to the action of forces and inertia, without difficulty. Examples for this purpose are shown in Figs. 11 and 12.

Assuming the mass M to be energized by the movement of an unbalanced mass U and to describe oscillations in the horizontal direction, it can be balanced, by means of the lever $w'$ and $w^2$, with their attached masses $m_g'$ and $m_g^2$, in such a manner that no effect is transmitted to the point of attachment. As in the preceding cases, elastic means $f'$ and $f^2$ may also be provided.

Fig. 12 shows an arrangement in which the mass M oscillates, between elastic means $f'$ and $f^2$, in a frame R. This oscillatory system is energized by a crank $g$, crank rod $h$ and elastic coupling $k$ composed of a rubber ring. The mass $m_g$ operates as a balance in the sense of the invention.

It follows from the foregoing that mass balancing can be obtained by combining the disturbed or disturbing mass with pendular systems of the steelyard type, in the sense of the invention, or, if the amplitude of movement of this pendular system is desired to be restricted in practice, supplementing or completing the same on the principle of the balance beam. In the latter event, the aggregate combination is to be regarded as an oscillatory, unit balanced with reference to force and inertia.

Having now particularly described and ascertained the nature of my said invention and in what manner the same is to be performed, I declare that what I claim is:—

1. A device for the balancing of forces and inertia of oscillating masses and for the elimination of vibration which comprises, a supporting base, an unbalanced oscillating mass, balance beams pivotally connected at one end to the said mass and between its ends to the said supporting base, balancing weights mounted on the other end of said balance beams so as to balance said oscillating mass in all directions, and elastic means interposed between said balance beams and another of said elements to form an oscillating unit in said device.

2. A device for balancing of forces and inertia of oscillating masses as defined by claim 1 in which the elastic means are composed of rubber bodies.

3. A device for the balancing of forces and inertia of oscillating masses as defined by claim 1 in which the elastic means are of such a material and construction as to produce pseudo-harmonic oscillations for the prevention of disturbing resonance vibrations.

4. A device for the balancing of forces and inertia of oscillating masses and for the elimination of vibration which comprises, a supporting base, an unbalanced oscillating mass, balance beams pivotally connected to the mass and the supporting base by means of cardan joints, balancing weights mounted on said balance beams in such a manner as to balance the irregular forces of the oscillating mass in all directions and elastic means interposed between the balance beams and other of said elements.

5. A device for the balancing of forces and inertia of oscillating masses as defined by claim 4 in which the balance beams are connected to the oscillating mass and the supporting base by means of yieldable elastic members.

6. A device for the balancing of forces and inertia of oscillating masses and for the elimination of vibration which comprises, a supporting base, an unbalanced oscillating mass of varying weight, balance beams pivotally connected to the mass and the supporting base, balancing weights mounted on said balance beams, elastic means interposed between the said elements and further means for adjusting the effective leverage of the balancing weights in agreement with the varying of the weight of the oscillating mass for the purpose of enabling the constant weight of the balance weights to balance the varying forces of the varying oscillatable mass in all directions.

7. A device for the balancing of forces and inertia of oscillating masses and for the elimination of vibration which comprises, a supporting base, an unbalanced oscillating mass of varying weight, balance beams having downwardly inclined lever arms pivotally connected to the oscillating mass and the supporting base, elastic means interposed between the said elements, balancing weights mounted on said balancing arms which are adapted, in combination with the balance beams, to balance the forces of the varying oscillating mass in all directions through the automatic varying of the effective leverage in the different angular positions of balance beams.

8. A device for the balancing of forces and inertia which issue from unbalanced masses in motion which comprises mounting the unbalanced moving mass on a support which is suspended by means of balance beams provided with balancing weights whereby the unbalanced moving mass in combination with the said support constitutes an unbalanced oscillating mass, elastic means interposed between the elements of the said oscillating mass, in order to dampen the amplitude of the mass and means for regulating the effective leverage of the balance beams, so that the balancing weights of the device, in combination with the balance arms are adapted to balance the moving mass with its support in all directions.

GEORG HEINRICH SCHIEFERSTEIN.